United States Patent Office 3,484,092
Patented Dec. 16, 1969

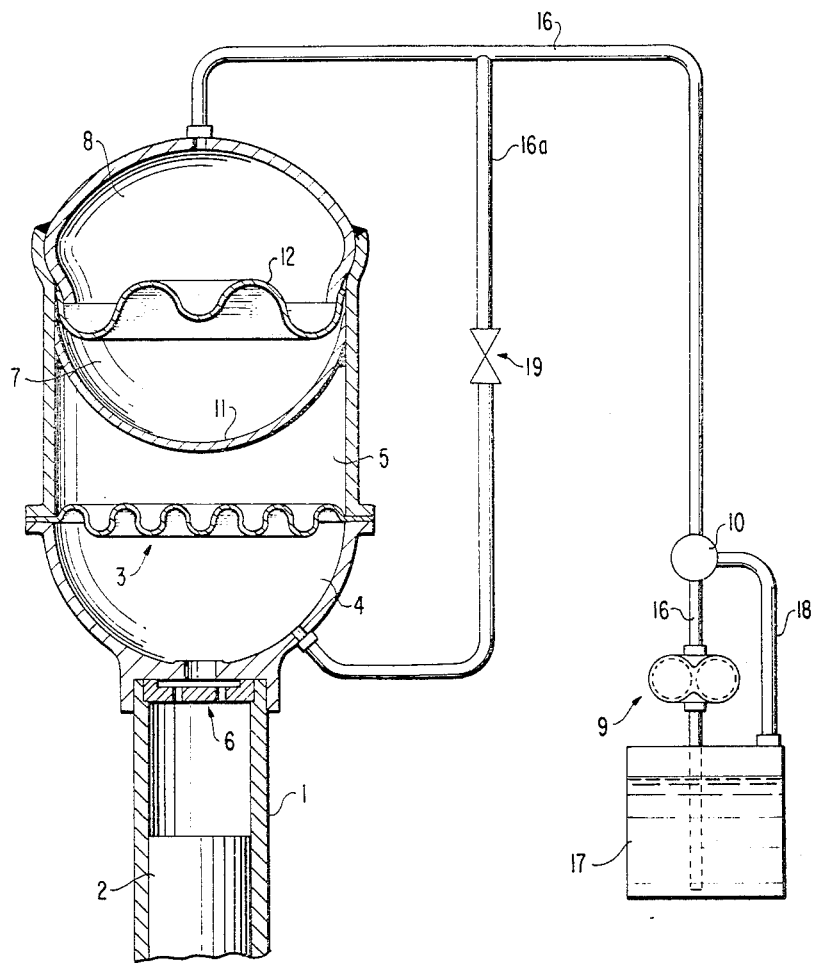

3,484,092
HYDROPNEUMATIC SPRING FOR VEHICLES
Diether Scarpatetti, Stuttgart, Germany, assignor to Daimler-Benz Aktiengesellschaft, Stuttgart-Unterturkheim, Germany
Filed Sept. 26, 1967, Ser. No. 670,630
Claims priority, application Germany, Sept. 30, 1966,
D 51,209
Int. Cl. F16f 9/08, 9/50; B60g 17/04
U.S. Cl. 267—64      8 Claims

ABSTRACT OF THE DISCLOSURE

A hydropneumatic spring for vehicles, which comprises a working piston movable within a working space separated from a primary spring space by a movable separating element, a secondary spring space in throttled communication with the primary spring space and connected with a control space by way of a second movable separating element; additionally, an installation is provided for the compensation of leakage oil losses which includes a control device responsive to the position of the body relative to the associated vehicle wheel and selectively establishing a connection between the pressure side of a pump and a return line in the normal position of the vehicle, and between the control space and either the pressure side of the pump or the return line depending on changes in the position of the vehicle reflecting an increase or decrease of the load, while the control space is further connected in effect with the working space by way of a throttled connection.

BACKGROUND OF THE INVENTION

The present invention relates to a hydropneumatic spring for vehicles having a hydraulic work space which is operatively connected by way of a movable or elastically deformable separating element with a primary pneumatic spring space, and an installation responsive to a change in load of the vehicle for the control of the primary spring space to a constant volume, in which the pressure level of a secondary pneumatic spring space in communication by way of a throttled connection with the primary spring space is adapted to be changed by a pressure source which is adapted to be brought into operative connection with a hydraulic control space operatively connected with the secondary spring space by way of a movable or elastically deformable separating element, and in which installation a control device influenced by the vehicle load is arranged between the pressure source and the control space and a hydraulic connection for the compensation of leakage oil losses is adapted to be established between either the pressure source or the control space, on the one hand, and the working space, on the other.

In a prior proposal (not pre-published), provision is made for the automatic compensation of leakage oil losses of the hydraulic working space such that the pressure of the control space or a magnitude derived from such pressure can be supplied as a first input signal and the pressure of the working space or a magnitude derived from this pressure can be supplied as a second input signal to a measuring device, in which the difference is formed between the first and second input signal whereby the difference of the input signals is supplied either directly or indirectly as control signal to a control device for the compensation of the leakage oil losses.

SUMMARY OF THE INVENTION

The basic aim underlying the present invention also resides in automatically compensating for the leakage oil losses of the hydraulic working space; however, in contrast to the prior proposal, this compensation is to be achieved by the present invention with more simple means. To this end, a continuous hydraulic connection is formed according to the present invention between the working space and pressure source or control space by a throttled by-pass line, and at least one resilient element adapted to be deflected from its normal position by pressure changes and resiliently returning into the normal position is arranged between the working space and the primary spring space so that the pressure is the working or spring space, which is increased by a deflection, is larger on the one side of the deflected element by the amount of the elastic or resilient return effect than the pressure in the space reduced by the deflection on the other side of the resilient element.

The solution proposed by the present invntion for the realization of an automatic compensation of the leakage oil started with the recognition that the leakage oil loss for a preselected operating duration is measurable by appropriate tests or is adapted to be estimated nearly accurately. By a corresponding matching of the elasticity of the springy element and of the throttling effect, produced for reasons to be explained more fully hereinafter in the hydraulic connection, to the leakage quantity to be considered in each case, this leakage quantity can be compensated for without great technical expenditures.

According to a further simplification of the hydropneumatic spring of the present invention, the movable or elastically deformable separating element between the working space and the primary spring space may simultaneously carry out the function of the resilient element.

This resilient element may, with one construction of the hydropneumatic spring according to the present invention, be constructed in the manner of an undulated membrane or diaphragm spring.

Accordingly, it is an object of the present invention to provide a hydropneumatic spring for vehicles which obviates by simple means the shortcomings encountered with the prior art.

Another object of the present invention resides in a hydropneumatic spring for vehicles in which leakage oil losses in the hydraulic working space are automatically compensated for with a minimum of parts and structural expenditures.

A further object of the present invention resides in a hydropneumatic spring of the type described above in which the movable separating element between the working space and the primary spring space is utilized to carry out simultaneously a further function in connection with the compensation.

These and further objects, features, and advantages of the present invention will become more obvious from the following description when taken in connection with the accompanying drawing which shows, for purposes of illustration only, one embodiment in accordance with the present invention and wherein:

The single figure is a cross-sectional view through a part of a hydropneumatic spring in accordance with the present invention, also indicating schematically the compensating device of the present invention.

Referring now to the single figure of the drawing, a working piston 2 is guided in a pressure-tight and displaceable manner within the working cylinder 1 of the hydropneumatic spring. The working cylinder 1 may be connected in any appropriate manner with the spring-supported vehicle superstructure or body while the working piston 2 may be operatively connected in any conventional manner with an unsprung wheel guide part.

The working cylinder 1 is subdivided by a ring-shaped undulated membrane spring generally designated by reference numeral 3 into a hydraulic working space 4 and a primary pneumatic spring space 5. The spaces 4 and 5 are also separated from one another in a gas- and fluid-tight manner by the membrane spring 3. For purposes of achieving a damping effect for the movements of the working piston 2, throttling damping-elements generally designated by reference numeral 6 which throttle the passage of the hydraulic medium, are arranged in the working space 4.

The hydropneumatic spring includes an installation for the control of the primary spring space 5 to a constant volume which installation responds to changes in the load of the vehicle. This installation essentially consists of a secondary pneumatic spring space 7, of a hydraulic control space 8, of an oil pump generally designated by reference numeral 9 of conventional construction and continuously supplying oil, and of a control valve 10 of any known, conventional construction influenced by the vehicle load.

The secondary spring space 7 is operatively connected, on the one hand, by way of a throttle bore 11 with the primary spring space 5 and, on the other, with the control space 8 by way of a sealing membrane or diaphragm 12.

A hydraulic line 16 is connected with the control space 8 which leads to a tank 17 for the hydraulic medium. The hydraulic medium is supplied from the tank 7 by way of the pump 9, arranged in the line 16, to the control valve 10, from where it flows back by way of a return line 18 to the tank 7 in the 0-position (discharge position) of this valve.

The 0-position of the control valve 10 is matched or adjusted to a normal position of the vehicle body, spring-supported by the hydropneumatic spring, with respect to the associated vehicle wheel with a predetermined vehicle load.

If the vehicle body is brought out of the normal position by an increase in load, then the valve body of the control valve 10 is forcibly displaced or moved into a second position—in any conventional manner—in which the return line 18 is closed and the control space 8 is connected to the pressure side of the pump 9.

If the spring-supported vehicle body changes its position with respect to the normal position as a result of a reduced vehicle load, then the movable valve body of the control valve 10 is forcibly moved into a third position—in a conventional manner—in which it closes the pressure side of the pump 9 for the line 16 and the control space 8 is connected with the return line 18.

OPERATION

At first the operation of the installation for the control of the primary spring space 5 to a constant volume will be explained:

In the illustrated position of the working piston 2, the spring-supported vehicle body is in its normal position.

With an increase of the vehicle load, the working piston 2 then moves toward the primary spring space 5 whose pressure increases with a temporary decrease of the spring volume.

The control valve 10 is thereby forcibly actuated into that position in which the control space 8 is connected with the pump 9. The pressure in the secondary spring space 7 is thereby increased and the gas volume in the primary spring space 5 is forcibly brought back to its original size or magnitude by way of the throttle aperture 11 so that the vehicle body again assumes its normal position.

With a decrease of the vehicle load, the working piston 2 moves away from the primary spring space 5 so that temporarily its volume is increased with simultaneous pressure decrease. The control valve 10 is thereby forcibly brought into that position in which the control space 8 is connected with the return line 18. The pressure in the secondary spring space 7 is reduced, and as a result of the pressure equalization by way of the throttle aperture 11, the spring volume corresponding to the normal position of the vehicle body is re-established in the primary spring space 5.

The automatic compensation of leakage oil losses in the working space 4 is achieved in the following manner.

A hydraulic short-circuit or by-pass line 16a, which leads to the working space 4, is connected to the line 16 between the control valve 10 and the control space 8. A throttling body of any conventional construction and generally designated by reference numeral 19 which has a preselected and predetermined throttling resistance, is arranged in the by-pass line 16a. If the volume of the hydraulic medium in the working cylinder 4 is reduced due to leakage losses, then the working piston 2 moves toward the primary spring space 5. As a result thereof, the control valve 10 is actuated into that position in which the control space 8 is connected with the pressure side of the supply pump 9. Consequently, hydraulic medium is pumped into the control space 8 for such length of time until, as a result of the pressure increase in the primary spring space 5, the vehicle body assumes again its normal position. The membrane or diaphragm spring 3 is deflected into the working space 4 as a result of the pressure increase in the spring space 5 so that the pressure in the spring space 5 is larger by the elastic return effect or resiliency of the membrane spring 3 than the pressure in the working space 4. Consequently, that quantity of the hydraulic medium will flow from the control space 8 by way of the throttling device 19 into the working space 4 which corresponds to the volume displaced by the deflection of the membrane spring 3. This means the leakage oil loss is compensated for, and the membrane spring 3 again elastically or resiliently returns into the illustrated normal position.

With dynamic pressure changes in the spaces 4 and 5, under the influence of the in- and out-spring movements of the working piston 2, the quantities of the hydraulic medium which flow in both directions through the line 16a are equal and are small due to the action of the throttling device 19 so that the volume of the hydraulic medium in the working space 4 remains constant.

Only with static position changes of the working piston which are not initiated or caused by the vehicle load—for example, by leakage oil losses in the working space 4 or by a volume increase of the hydraulic medium due to heating—hydraulic medium is supplied as a result of the elastic return effect or resiliency of the membrane spring 3 either into the working space 4 as in the first case or into the control space 8 as in the second case.

I claim:

1. A hydropneumatic spring for vehicles provided with a hydraulic working space which is operatively connected by way of a movable separating element with a primary pneumatic spring space, and having an installation responsive to load changes of the vehicle for the control of the primary spring space to a constant volume, in which the pressure level of a secondary pneumatic spring space in throttled communication with the primary spring space is adapted to be changed by a pressure source which can be brought into operative connection with a hydraulic control space operatively connected with the secondary spring space by a movable separating element, and in which installation a control device influenced by the vehicle load is arranged between the pressure source and the control space while a hydraulic connection is adapted to be selectively established between either the pressure source or the control space, on the one hand, and the working space, on the other, for the equalization of leakage oil losses, wherein the improvement comprises hydraulic connecting means providing a constant operative connection between the working space and said installation including throttled by-pass line means, and at least one resilient means arranged between the working space and the primary spring space which is adapted to be deflected from the normal position by pressure changes and resiliently returns into the normal position so that the pressure in the space on the one side of the deflected resilient means, which is increased by a deflection, is larger by an amount of the resilient return effect of said resilient means than the pressure in the space of the other side of the resilient means reduced by such deflection.

2. A hydropneumatic spring according to claim 1, wherein the movable separating element between working space and primary spring space is constructed as resilient means.

3. A hydropneumatic spring according to claim 2, wherein said resilient means is constructed in the manner of an undulated diaphragm spring.

4. A hydropneumatic spring according to claim 1, wherein said resilient means is constructed in the manner of an undulated diaphragm spring.

5. A hydropneumatic spring system especially for vehicles, which includes a working piston movable within a working space separated from a primary spring space by a movable element, a secondary spring space in throttled communication with said primary spring space and operatively connected with a control space by way of a second movable element, and an installation for the automatic level readjustment having a control device responsive to the changes in the relative position of the vehicle to a reference level and operable to selectively establish an operative connection between the pressure side of a supply pump in the normal position of the vehicle and between the control space and either the pressure side of the pump or the return line depending on changes in the position of the vehicle reflecting an increase or decrease in the load, wherein the improvement comprises means for automatically compensating for leakage oil losses including throttled continuous connecting means between the working space and said installation, and further means effectively establishing a pressure differential between said installation and said working space to cause the flow of oil into the working space so as to replenish the same with oil.

6. A hydropneumatic spring according to claim 5, wherein said throttled connecting means is operatively connected between the working space and the control space.

7. A hydropneumatic spring according to claim 6, wherein said further means is formed by said first-mentioned movable element which is resilient for that purpose.

8. A hydropneumatic spring according to claim 5, wherein said further means is formed by said first-mentioned movable element which is resilient for that purpose.

References Cited

UNITED STATES PATENTS

| | | | |
|---|---|---|---|
| 3,033,552 | 5/1962 | Ogden | 267—64 |
| 3,424,449 | 1/1969 | Strigler | 267—64 |

JAMES B. MARBERT, Primary Examiner